Aug. 9, 1966  E. H. FAUST  3,265,110

AUTOMOBILE ANTI-SKID CHAIN ASSEMBLY ATTACHMENT

Filed Nov. 12, 1964

INVENTOR
Ernest Faust 3,265,110
AUTOMOBILE ANTI-SKID CHAIN ASSEMBLY ATTACHMENT
Ernest H. Faust, North Road, Highland, N.Y.
Filed Nov. 12, 1964, Ser. No. 410,811
1 Claim. (Cl. 152—242)

This invention concerns an improved anti-skid tire chain assembly. The object of this invention is a low cost chain assembly that can be very easily and quickly applied, without the need for jack-up or car movement, and that will nevertheless readily maintain its proper position on the wheel.

A further object of this invention is to arrange low-cost rigid members in a configuration which will be inherently stable but will be flexible enough to find and to maintain its proper position despite road stress.

A further object of this invention is to provide a device giving adequate anti-skid action for most circumstances and yet being collapsible to a very small volume when not in use.

A further object of this invention is to provide a device which will continue to perform its basic function despite the breakage of some cross-links.

The invention consists, broadly, of two semi-rigid structures, composed of low-cost rods and chains, formed in nearly equilateral triangles, one for each side of a wheel, with cross chains extends across the tire, connecting the vertices of one triangle with those of the other, and with means for manually closing and fastening these two triangular structures.

Figure 1:
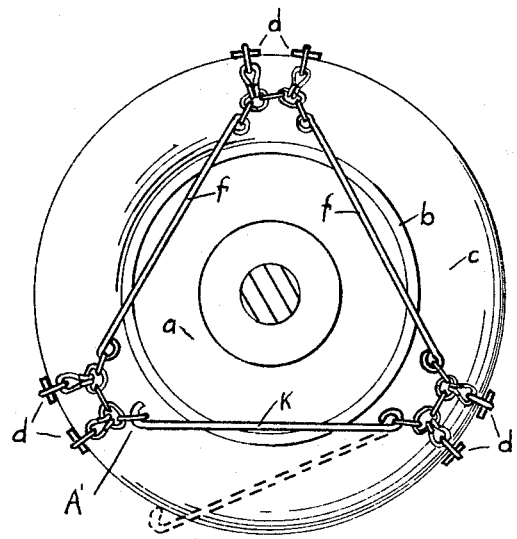

FIGURE 1 shows the invention mounted on a wheel, as viewed from the inner side of the wheel. The tire $c$ is mounted on the wheel $a$ having rim $b$. The equilateral triangle is formed of two rods with closed-loop ends $f$ and one rod $k$ having one closed-loop end and one open-hook end. The closure of the triangle is achieved manually at $A'$ where a receiving chain-link can be hooked by the rod $k$.

Figure 4:
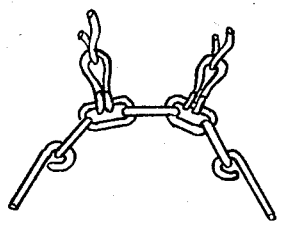
Figure 5:
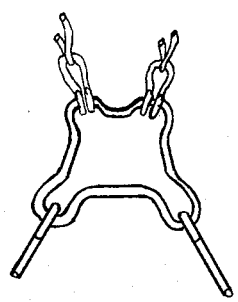

Three sets of dual cross-chains $d$ are held in place by connectors providing a flexible connection among the ends of a pair of cross-links and the ends of a pair of rods. Two illustrations of said flexible connectors are shown in FIGURES 4 and 5. FIGURE 4 shows a connector wherein the flexible connection among rods and cross-links is achieved by a five-link chain. FIGURE 5 shows an alternative shaped-rod connector. Changes in the specific form of the flexible connector may be made within the scope of what is claimed, without departing from the spirit of the invention.

Figure 2:
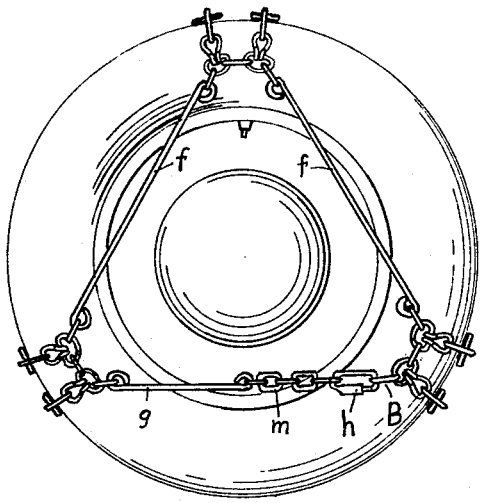

FIGURE 2 shows an outside view of this wheel with the invention mounted thereon. Two sides of the equilateral triangle are formed by closed-end rods $f$. The third side is formed by a shorter closed-end rod $g$, links of chain $m$ and a manual snap-fastener $h$, which is attached at point B.

Figure 3:

FIGURE 3 shows an optional hook which may be used to help retrieve and connect the assemblage on the inner side of the wheel.

The application of the device is simple. After placing the center dual cross-chain over the center top of the tire, the other two dual cross-chains will fall equidistant to the forward and rear portions of the tire. The unattached end of the lower inside rod $k$ is retrieved under the axle, drawn back, and attached to the end bottom link at point $A'$. A hook such as the one shown in FIGURE 3 may be used to facilitate this retrieval. This completes the inner assembly.

The outside fastening is accomplished by connecting the snap fastener at B. No tension is required, but a close fit is readily obtained by snapping to the appropriate link. The chain assembly is thus permitted that small freedom of movement on the tire necessary for self-adjustment of position.

What is claimed is:

An anti-skid traction device for wheels of motorized vehicles, comprising a semi-rigid assemblage of rods and chain on both sides of a wheel; said assemblage consisting of three rods of equal length plus connectors, on the inner side of a wheel; and consisting of two rods of equal length, a third rod of shorter length, connectors, and chain on the outer side of the wheel; said assemblage forming a semi-rigid, closed and approximately equilateral triangular-structure on both sides of the wheel; said connectors providing a flexible connection among ends of two rods and also the ends of two sets of cross chains, at two of the points of each said triangular structure; said connectors also providing a flexible connection at the third point of the triangular structure on the outer side of the wheel, among the ends of two sets of cross chains, the end of one rod, and a snap fastener; said connector also providing a flexible connection at the third point of the triangular structure on the inner side, among the end of one rod, the ends of two sets of cross chains, and a hooked rod-end; said hooked rod arranged to permit manual closure of the triangular structure on the inner side of the wheel; and said snap fastener arraanged to permit manual closure of the triangular structure on the outside of the wheel, in connection with the cascaded aforementioned rod of shorter length and connecting chain; said triangular structures being each collapsible, when off the wheel, to three parallel rods plus their connectors, and chain links; three pairs of cross chains, extending across the tire, with one pair of cross chains connecting each point of the triangular structure on the inner side of the wheel with a point on the triangular structure on the outer side of the wheel; said cross chains connected so as to maintain the triangular shape in the structures on both sides of the wheel and arranged so that the breakage of any one chain in any pair or combination of pairs of cross-chains does not affect this maintenance of the triangular shapes.

References Cited by the Examiner
UNITED STATES PATENTS

| | | | |
|---|---|---|---|
| 1,409,296 | 3/1922 | Hogshead et al. | 152—242 |
| 2,735,472 | 2/1956 | Beery | 152—242 |
| 2,918,960 | 12/1959 | McGuinness | 152—242 |

ARTHUR L. LA POINT, *Primary Examiner.*
C. W. HAEFELE, *Assistant Examiner.*